(No Model.)

F. REINHARDT.
APPARATUS FOR OPERATING GLASS MOLDS.

No. 532,702. Patented Jan. 15, 1895.

Witnesses:
J. B. McGirr.
Lindley S. Anderson.

Inventor:
F. Reinhardt
by Connolly Bros
attys.

UNITED STATES PATENT OFFICE.

FREDRICK REINHARDT, OF ELLWOOD CITY, PENNSYLVANIA.

APPARATUS FOR OPERATING GLASS-MOLDS.

SPECIFICATION forming part of Letters Patent No. 532,702, dated January 15, 1895.

Application filed September 14, 1893. Renewed November 10, 1894. Serial No. 528,449. (No model.)

*To all whom it may concern:*

Be it known that I, FREDRICK REINHARDT, a subject of the Emperor of Germany, residing at Ellwood City, in the county of Lawrence and State of Pennsylvania, have invented certain new and useful Improvements in Apparatus for Operating Glass-Molds; and I do hereby declare the following to be a full, clear, and exact description of the invention, such as will enable others skilled in the art to which it appertains to make and use the same.

This invention has relation to glass mold operating apparatus, and has for its object the provision of novel means for opening and closing glass molds, the closing of the mold being effected automatically and the opening produced by the glass blower, operating a treadle connected with the mold through the intervention of suitable levers.

My invention consists in the novel construction and combination of devices hereinafter described and claimed.

Figure 1:
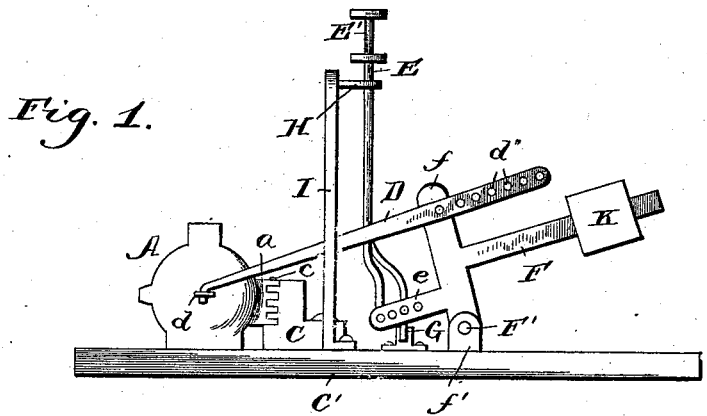
Figure 2:
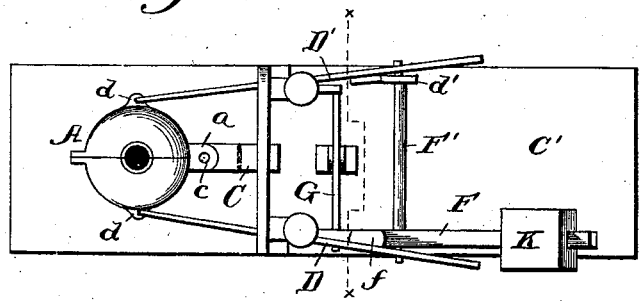
Figure 3:
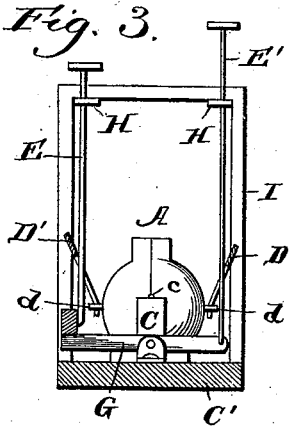
Figure 4:
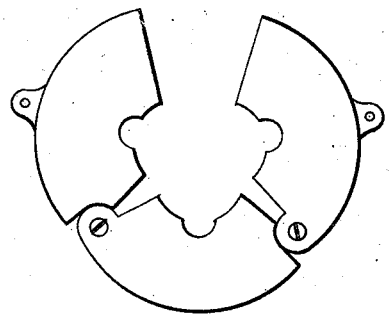

In the accompanying drawings, Figure 1, is a side elevation of a mold operating apparatus embodying my invention. Fig. 2, is a plan view of the same. Fig. 3, is a transverse sectional view; Fig. 4, a modification.

A designates a glass mold of ordinary construction, consisting of two or more parts, hinged together at $a$. The mold for the purposes of this invention is pivotally mounted on a suitable bracket C on the base C' the hinge pivot $c$ serving as the axis upon which the sections of the mold turn. The mold has projecting from each side a perforated lug $d$, and to these lugs are connected the arms D D', by means of loops or hooks, so that when the arms D D' are moved lengthwise the mold sections will either be opened or closed according to the direction of the movement. The arm D is connected to the upright limb $f$ of a bell crank lever F, which is mounted on and at one end of a transverse horizontal shaft F', having its bearings in lugs $f'$, on the base C. On the opposite end of the shaft F' is mounted an upright arm $d'$ similar to the limb $f$, to which is attached the arm D'. A treadle E is attached to the forward extension $e$ of the lever F, and another treadle E' is attached to a transverse bar G connected to the extension $e$ and extending to the opposite side of the machine. The treadle rods pass through holes in a guiding plate H attached to a stationary frame I mounted on the base C. The rear extension or main limb F' of the lever F carries an adjustable counterpoise weight K.

The arms D, D' are pierced at intervals by holes $d$, for the reception of pins connecting the arms with the limb $f$ and arm $d'$, and to allow the arms to be adjusted to different sized molds.

When the parts are arranged as shown and described, the mold is kept open by the gravity of the weight K, until the glass to be blown is inserted, after which the blower, or an attendant presses down one of the treadles with his foot, thus raising the weight, and thrusting forward the arms D, D', which close the mold. When the treadle is released the weight falls and again opens the mold.

It is apparent that one of the mold sections may be held stationary and the other opened, in which case the opening and closing apparatus need have but one of the arms D or D'

Having described my invention, I claim—

1. In an apparatus for opening and closing glass molds, the combination of the bell crank lever F, carrying the counterpoise weight K in its rear extension, the perforated longitudinally adjustable arm D, attached to the upright limb $f$, of said lever, and adapted to be connected to a mold section, and the treadle E, attached to the forward extension of the lever F, substantially as described.

2. In an apparatus for operating glass molds, the combination of the bell crank lever F, the counterpoise weight K, attached to the rear extension of said lever, the shaft F', on which the lever F is mounted, the arm $d'$, mounted on said shaft, the arms D D' connecting the limb $f$ and arm $d'$ with the mold sections, the transverse bar G attached to the lever F, and the treadles E E' attached respectively to the lever F, and the bar G, substantially as described.

3. In an apparatus for opening and closing glass molds, the combination of the bell crank lever F, carrying the counter-poise weight K, on its rear extension, the arm D, attached to the upright limb $f$, of said lever and adapted to be connected to a mold section, the transverse shaft F', upright limb $d'$, arm D', adapted to be connected to the other mold section and the treadle E, attached to the forward extension of the lever F, substantially as described.

In testimony whereof I affix my signature in presence of two witnesses.

FRED. REINHARDT.

Witnesses:
C. P. BROBECK,
HENRY KOMMEL.